March 3, 1964  B. D. BECK  3,123,345
REFRACTORY STRUCTURE FOR MOLTEN GLASS
Filed March 25, 1959  2 Sheets-Sheet 1

INVENTOR.
BASIL D. BECK
BY J.R. Nelson
W. A. Schaich
ATTORNEYS

United States Patent Office 3,123,345
Patented Mar. 3, 1964

3,123,345
REFRACTORY STRUCTURE FOR MOLTEN GLASS
Basil D. Beck, Bridgeton, N.J., assignor to Owens-Illinois
Glass Company, a corporation of Ohio
Filed Mar. 25, 1959, Ser. No. 801,859
4 Claims. (Cl. 263—46)

This invention relates to refractory structures for containing molten glass which is to be subsequently used in making glass articles and particularly to the construction of the joints between adjacent refractory blocks in such structures.

In making glass articles, it is customary to cause the molten glass formed by melting the glass making constituents to flow into an area from which the glass is drawn for use. In the case of glass containers and the like, molten glass is flowed into a revolving pot or a forehearth. Each of these structures is made from a plurality of refractory blocks which have abutting faces. Since the structures are assembled when the refractory blocks are cold, a major problem arises when the structures are placed into use due to the expansion of the refractory blocks. As a result of this expansion, there is a tendency for the molten glass to leak out between and erode the refractory blocks. This tendency is most pronounced at the glass level. In the case of a forehearth where the body of molten glass is moved longitudinally from one end of the forehearth to the other there is a further tendency to leakage and erosion between the refractory blocks forming the bottom of the forehearth. In practice, it is customary to periodically patch the leaking or eroded areas by use of an appropriate refractory cement. This remedy is only temporary and after prolonged erosion it is necessary to reconstruct the refractory structure.

It is therefore an object of this invention to provide a novel seal for refractory structures adapted to contain molten glass which will effectively prevent leakage and erosion of the refractory structures; which will withstand the high temperatures of the molten glass; which is relatively low in cost compared with the cost of replacement or reconstruction of the refractory structures; and which will thereby prolong substantially the life of the refractory structures.

According to the invention, the abutting faces of the refractory blocks forming the refractory structure are provided with complementary grooves and a solid sealing member made of a material which is highly resistant to oxidation and corrosion by molten glass is provided in the grooves. The sealing member extends transversely of the abutting faces and substantially fills the grooves. In the case of a revolving pot, the grooves and sealing members are provided in the blocks forming the rim of the pot which are at substantially the level of the molten glass. In the case of the forehearth, the sealing members are preferably provided between the abutting faces of the refractory blocks which form the sides and bottom of the forehearth.

Figure 1:
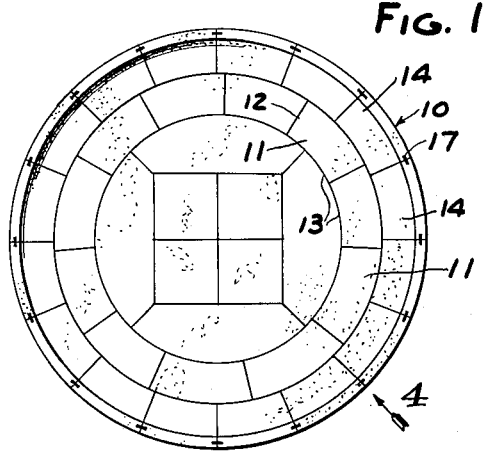
FIG. 1 is a plan view of a revolving pot embodying the subject invention.

Referring to FIG. 1, a conventional revolving pot 10 comprises a plurality of refractory blocks 11 which have abutting faces 12 and inwardly facing surfaces 13. When blocks 11 are assembled, a pot or bowl is provided into which the molten glass is directed and maintained. In practice, a batch or parison of glass is removed from revolving pot 10 periodically as needed.

Figure 3:
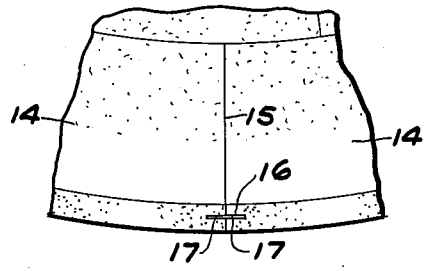
FIG. 3 is a fragmentary plan view on a relatively enlarged scale of a portion of the rim of the revolving pot shown in FIG. 1.
Figure 4:
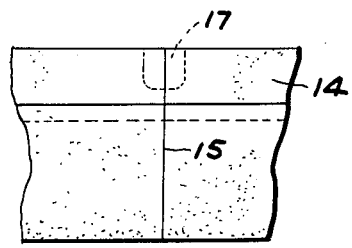
FIG. 4 is a fragmentary elevation of a portion of the revolving pot shown in FIG. 1 taken in the direction of the arrow 4.
Figure 5:
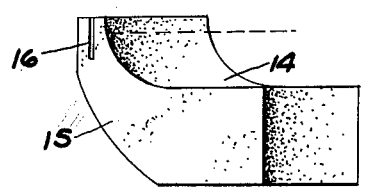
FIG. 5 is a side elevation of one of the refractory blocks forming the rim of the revolving pot shown in FIG. 1.

In a revolving pot such as that shown in the drawings, there is a tendency for the molten glass to leak between the abutting faces particularly in the area of uppermost blocks 14 which form the pot rim. Blocks 14 have inner and outer curved surfaces which converge upwardly so that the upper portions of blocks 14 have a lesser cross section than the lower portions (FIG. 5). Blocks 14 have abutting surfaces 15 which are substantially vertical and extend radially (FIG. 3). The glass level is maintained adjacent the upper edge of the blocks 14 as represented by the dotted line in FIG. 5.

Figure 2:
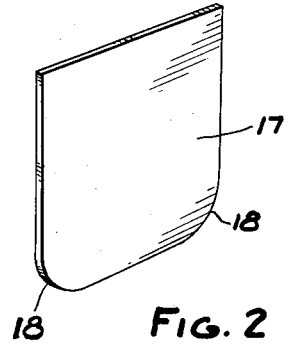
FIG. 2 is a perspective view of a sealing member used in providing the joint in the subject invention.

According to the invention, adjacent abutting surfaces 15 near the periphery or outermost part of each block 14 are provided with complementary vertically extending grooves 16 having a greater depth than thickness. A sealing member 17, in the form of a plate of uniform thickness which has greater width and length than thickness, is positioned in each pair of complementary grooves 17 and substantially fills the grooves. As shown in FIG. 2, sealing member 17 is generally rectangular and the lower corners 18 thereof are curved to facilitate insertion of the sealing member 17 in grooves 16.

Sealing member 17 must be made of a material which is highly resistant to oxidation and corrosion by molten glass; which has sufficient strength and ductility at elevated temperatures so that it will not crack; and which is chemically compatible with molten glass. Excellent results have been achieved by making sealing member 17 of Inconel 702 alloy which is an alloy of International Nickel Company having the following typical composition:

Carbon _____ 0.1% max.
Manganese _____ 1.0% max.
Silicon _____ 0.7% max.
Sulphur _____ 0.01% max.
Iron _____ 2.0% max.
Copper _____ 0.5% max.
Chromium _____ 14.0–17.0.
Aluminum _____ 2.75–3.75.
Titanium _____ 0.25–1.0.
Nickel _____ Balance.

Other metals may be used such as Inconel, Thermenol and Kanthal.

Inconel is an alloy made by International Nickel Company and having the following typical composition:

|  | Percent |
|---|---|
| Chromium | 14.0–17.0 |
| Iron | 11.0 |
| Manganese | 1.50 |
| Silicon | 3.0 |
| Carbon | 0.40 |
| Nickel | Balance |

Thermenol is an alloy made by the Naval Ordnance

Laboratory, White Oak, Silver Spring, Maryland having the following typical composition:

| | Percent |
|---|---|
| Alluminum | 17.0 |
| Molybdenum | 3.3 |
| Carbon | 0.06 |
| Manganese | 0.1 |
| Phosphorus | 0.005 |
| Sulphur | 0.006 |
| Silicon | 0.02 |
| Nickel | 0.16 |
| Chromium | Nil |
| Nitrogen | 0.017 |
| Oxygen | 0.0031 |
| Hydrogen | Nil |

Kanthal is an alloy made by the Kanthal Corporation, Amelia Place, Stamford, Connecticut having the following typical composition:

| | Percent |
|---|---|
| Iron | 67 |
| Chromium | 25 |
| Aluminum | 5 |
| Cobalt | 3 |

It can be appreciated that the nature of the material which may be used to form the sealing member 17 may vary depending upon the nature and temperature of the molten glass.

Figure 6:
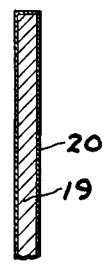
FIG. 6 is a vertical section through a modified form of sealing member.

In addition to using a metal which is highly resistant to oxidation and corrosion by molten glass, sealing members 17 may be made of metal plates 19 which are provided with a coating 20 (FIG. 6) in order to make them highly resistant to oxidation and corrosion by molten glass. For example, molybdenum may be provided with a coating which renders it highly resistant to oxidation and corrosion by molten glass. Various coatings which are well known in the art may be used. The following are representative of coated molybdenum plates which give satisfactory results:

*Example I*

A vacuum arc-cast unalloyed molybdenum sheet of approximately 1/8 inch thickness and having a dimension of 2⅝ inches by 2⅝ inches was cleaned and uniformly coated with 80% Nisiloy and 20% aluminum. Nisiloy is an alloy made by International Nickel Company and having the composition of approximately 60% nickel, 30% silicon and the balance iron. The coated molybdenum was then diffusion treated for two hours in the presence of dry argon at 2000° F. The resultant coating on the sealing members had a thickness of approximately 0.017 inch.

When used in a seal between abutting refractory blocks in the rim of a revolving pot, the sealing members provided an effective seal and prolonged the life of the revolving pot.

*Example II*

Plates of molybdenum similar to those used in Example I were uniformly coated with 88% aluminum and 12% silicon and diffusion treated in dry argon at 2000° F. The resultant coating on the sealing members had a thickness of approximately 0.006 inch.

When used to form the seal between abutting refractory blocks in the rim of a revolving pot, the sealing members effectively prevented leakage and prolonged the life of the revolving pot.

Although I do not fully understand the nature of the coating obtained in Examples I and II, I believe that the resultant coating is an alloy of the base metal and the mixture which is applied.

Other metals which are not in themselves resistant to oxidation and corrosion by molten glass but which may be coated in order to be made so resistant may be used to form the sealing member. Such metals comprise tungsten, iron, columbium. Coatings for such metals are well known in the art.

Because of the difficulty encountered in forming grooves in blocks 14 which form the pot rim due to their shape, it has been found most practical to form the seal adjacent the upper edges only of blocks 14 where the tendency for leakage and erosion by molten glass is greatest and where the thickness of blocks 14 is least. The seal may be provided throughout the abutting faces of blocks 14.

Figure 7:
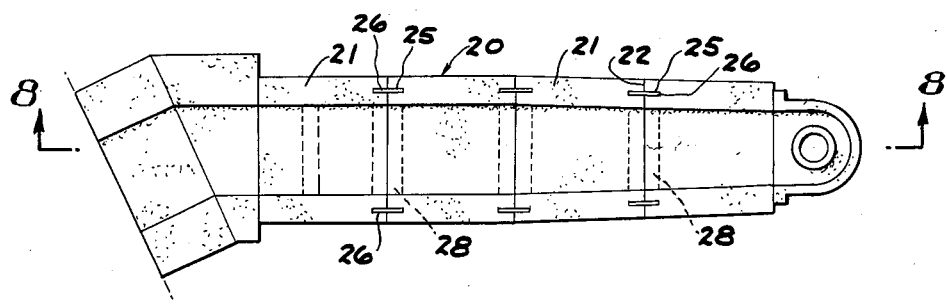
FIG. 7 is a plan view of a forehearth embodying the subject invention.
Figure 8:
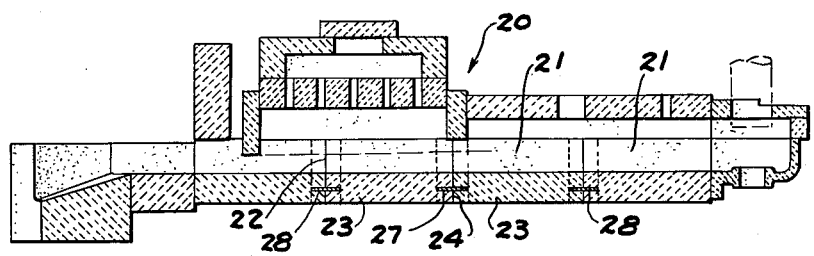
FIG. 8 is a sectional view taken along the line 8—8 in FIG. 7.

The invention may also be adapted to other types of refractory structures such as the forehearth 20 shown in FIGS. 7 and 8. Such a forehearth is made of a plurality of side refractory blocks 21 having abutting faces 22 and bottom refractory blocks 23 having abutting faces 24. In a forehearth, the tendency to leakage and corrosion is most critical at the level of the glass, shown in dotted lines in FIG. 8, and at the center of the bottom blocks 23.

Figure 9:
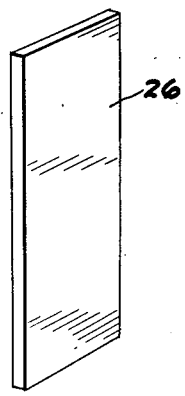
FIG. 9 is a perspective view of a sealing member used in the forehearth shown in FIGS. 7 and 8.

According to the invention, abutting surfaces 22 of the side blocks 21 are formed with complementary grooves 25 which extend vertically throughout the faces 22 and have a greater depth than thickness. A sealing member 26 is positioned in each pair of grooves 25 and substantially fills the grooves 25. As shown in FIG. 9, sealing plates 26 are generally rectangular and have a greater width than thickness.

Bottom blocks 23 are formed with horizontal grooves 27 in the abutting faces thereof, the depth of the grooves being substantially greater than their width and the grooves extending throughout the faces 24. Sealing members 28 are positioned in the grooves and substantially fill the grooves.

Sealing members 26 and 28 are in the form of plates of uniform thickness and are made of a material which is highly resistant to oxidation and corrosion by molten glass, similar to the material from which the sealing members 17 are made in the form of the invention shown in FIGS. 1–6.

In the arrangement shown in FIGS. 7 and 8, the tendency to leakage and corrosion at the level of the glass and at the centers of the bottom blocks 23 is substantially eliminated and the life of the forehearth is greatly prolonged.

Although best results are achieved by having the seal extend throughout the length of the abutting faces of refractory blocks 21, 23, a satisfactory seal may be obtained by having the seals in side blocks 21 only at the area of the glass level and in bottom blocks 23 only at the centers thereof, where the tendency to leakage and erosion is greatest.

It can thus be seen that I have provided a relatively inexpensive construction for effectively sealing the abutting faces of a refractory structure for holding molten glass in the areas where there is the tendency to leakage and erosion thereby prolonging the life of the refractory structure.

I claim:

1. In a refractory structure for containing molten glass, the combination comprising a plurality of blocks of refractory material defining a container for containing a body of molten glass, each said block having a glass contacting surface, top and bottom faces and generally vertical end faces at an angle to said glass contacting surface, said blocks being positioned in side by side relationship with said vertical faces abutting and said glass contacting surfaces defining a wall adapted to be contacted by a body of molten glass, the abutting vertical faces of said blocks being provided with opposed grooves extending generally vertically above and below the glass level, each said groove extending downwardly from the top face of each block and terminating in spaced relation to the bottom face, and a sealing member positioned in said opposed grooves and substantially filling said grooves above and below said glass level, said sealing member being made of a material which is highly resistant to oxidation and corrosion by molten glass.

2. The combination set forth in claim 1 wherein each said groove is generally rectangular and of generally uniform depth with its greatest dimensions extending in a direction transverse to said abutting vertical faces.

3. The combination set forth in claim 1 wherein said blocks comprise the rim of a revolving glass pot.

4. The combination set forth in claim 1 wherein said blocks comprise a portion of the side wall of a glass forehearth, including a plurality of bottom wall blocks in said forehearth, said bottom wall blocks having abutting end faces and glass contacting surfaces at an angle to said abutting end faces, the abutting end faces of said bottom wall blocks being provided with opposed grooves extending generally horizontally, and a sealing member positioned in said opposed grooves and substantially filling said opposed grooves of said bottom wall blocks, said last-mentioned sealing members being made of a material which is highly resistant to oxidation and corrosion by molten glass.

References Cited in the file of this patent
UNITED STATES PATENTS

| | | |
|---|---|---|
| 1,248,478 | Golightly | Dec. 4, 1917 |
| 1,355,097 | Meyercord | Oct. 5, 1920 |
| 1,492,685 | Hale | May 6, 1924 |
| 1,504,835 | McTarnahan | Aug. 12, 1924 |
| 2,029,082 | Odam | Jan. 28, 1936 |
| 2,369,100 | Young | Feb. 6, 1945 |
| 2,392,551 | Roe | Jan. 8, 1946 |
| 2,532,190 | Pirani et al. | Nov. 28, 1950 |
| 2,835,938 | McElroy | May 27, 1958 |
| 2,933,920 | Steuler | Apr. 26, 1960 |